Patented Mar. 25, 1952

2,590,771

UNITED STATES PATENT OFFICE 2,590,771

POLYMERIZATION BY MEANS OF STANNIC CHLORIDE AND A PROMOTER THEREFOR

Thomas E. Jordan, Philadelphia, and Edwin L. Cline, Pittsburgh, Pa., assignors to Allied Chemical & Dye Corporation, New York, N. Y., a corporation of New York No Drawing. Application May 8, 1948, Serial No. 25,988

13 Claims. (Cl. 260—81)

This invention relates to resin production and more particularly to modification of stannic chloride catalyst in the polymerization of compounds of the indene-coumarone-styrene type.

The polymerizing action of stannic chloride on compounds such as coumarone, indene and styrene present in oils such as solvent naphtha and drip oils is well known. Stannic chloride produces resins having certain desirable properties but polymerization proceeds much less rapidly in the presence of this catalyst than in the presence of sulfuric acid catalyst, and stannic chloride is considerably more expensive than sulfuric acid. These disadvantages place stannic chloride at a serious economic disadvantage as compared with sulfuric acid in commercial production of paracoumarone resin.

It is an object of this invention to obtain a more rapid rate of polymerization of paracoumarone resin-forming compounds than can be obtained by use of equivalent quantities of stannic chloride alone.

It is another object of the invention to reduce substantially the amount of stannic chloride catalyst required for polymerizing the resin-forming constituents of oils such as coal tar and water gas tar distillates, drip oils, and the like. Other objects and advantages will appear hereinafter.

In accordance with the invention a small amount of a compound selected from the group consisting of primary monohydroxy alcohols and aldehydes containing not more than 8, preferably not more than 4, carbon atoms is employed to modify the stannic chloride catalyst in polymerizing polymerizable compounds such as indene, coumarone, styrene and their homologs. The use of such alcohols and aldehydes as stannic chloride catalyst modifiers greatly reduces the time required for polymerizing the resin-forming content of a given paracoumarone resin oil containing the above polymerizable compounds as compared with the time required to effect polymerization by the same amount of stannic chloride alone. Further, the effect of such alcohols and aldehydes permits material reduction of the amount of stannic chloride which would otherwise be required to effect polymerization in a given time.

The primary monohydroxy alcohols and aldehydes employed in the invention process contain not more than 8, preferably not more than 4, carbon atoms. Such alcohols and aldehydes are soluble in the oil media in which polymerization is effected. Representative examples of suitable alcohols and aldehydes are: methanol, ethanol, n-propyl alcohol, the primary butyl alcohols, n-hexyl alcohol, furfuryl alcohol, benzyl alcohol, ethylene chlorhydrin, beta- and gamma-chloropropyl alcohols, the ring-substituted chlorobenzyl alcohols, formaldehyde, acetaldehyde, propionaldehyde, butyraldehyde, benzaldehyde and the tolualdehydes. The alcohols and aldehydes utilized in the invention may be substituted by either organic or inorganic substituents; for example, in ethylene chlorhydrin a chlorine substituent is attached to the beta carbon atom. The expression "primary monohydroxy alcohols" is intended to include substituted compounds such as ethylene chlorhydrin as well as the usual alcohols. The above catalyst modifiers may be employed either in anhydrous condition or may be utilized in aqueous solution, but the amount of water present during polymerization should not exceed 0.1% based on the volume of the oil.

In carrying out the invention the amount of stannic chloride may vary from 0.1% to 5%, preferably from 0.25% to 1% based on the volume of the resin oil. The amount of alcohol or aldehyde should not exceed 1% by volume and, preferably, should fall within the range of 0.05 to 0.5% by volume based on the oil. Higher amounts of the tannic chloride modifiers within this range are employed when larger amounts of stannic chloride catalyst are utilized. Ordinarily, the amount of such modifiers should not exceed 50% by volume, based on the stannic chloride. Larger amounts of alcohol or aldehyde are not advantageous and may seriously retard polymerization.

The oil fractions which may be treated in accordance with the invention include oils formed in the distillation of coal and carburetion of water gas, which oils are obtained during the coking of coal, distillation of coal tar or water gas tar, or are collected in coal gas and water gas distribution systems. Solvent naphtha, coke oven light oil, drip oil and water gas tar distillates are representative of such oils. These oils contain varying but substantial amounts, e. g. from 3% to 20% by volume, of indene, coumarone, styrene or their homologs such as methylindene, methylcoumarone and methylstyrene, and ordinarily contain mixtures of two or more of such compounds. Various fractions of the oils may contain materially larger proportions of the compounds. Preferably, fractions of such oils boiling within the range of 125° to 235° C., particularly from 150° to 205° C., are utilized. The oils may be more closely fractionated to obtain fractions in which different individual polymerizable compounds predominate. Thus, for example, fractions boiling within the range of 125° to 150° C. ordinarily contain styrene as the chief polymerizable constituent; fractions boiling within the range of 170° to 190° C. contain indene as the chief polymerizable constituent; and fractions boiling intermediate these ranges may contain larger proportions of styrene homologs such as methylstyrene and coumarone together with some styrene and indene. The polymerizable content of drip oil fractions boiling at from 150° to 205° C. is frequently largely indene and methylstyrenes, and the polymerizable content of fractions boiling at from 205° to 235° C. may include one or more styrene, coumarone and indene homologs such as 2,4,5-trimethyl styrene, 2,4,6-trimethyl styrene, 1,3-dimethyl indene, o-m-dimethyl coumarone, p-ethyl coumarone, o-p-dimethyl coumarone, m-p-dimethyl coumarone and 1,2-dimethyl indene. The proportions of the individual polymerizable compounds in the oil depend upon the source of the oil and the particular boiling range of the fraction. Instead of utilizing such oil fractions, substantially pure polymerizable materials, e. g. synthetic indene or synthetic styrene, or mixtures thereof, or their homologs such as methylstyrene or methylindene, may be mixed with an inert solvent such as xylene or other non-polymerizable hydrocarbon to form the resin oil.

The invention may be carried out by introducing the resin oil, stannic chloride catalyst and alcohol or aldehyde employed as catalyst modifier into a reaction vessel and controlling the temperature of the oil by cooling or heating or by the rate of addition of the reactants so as to produce resin having the desired properties. The reaction is preferably carried out at a substantially constant preselected temperature within the range of −20° to 100° C. Ordinarily, higher polymers of higher melting point and lower oil solubility are formed at lower polymerization temperatures than are produced from the same oil and the same amount of catalyst when the polymerization is carried out at higher temperatures. For example, polymerization temperatures of from 30° to 70° C. may be maintained when it is desired to produce resins of 145° to 160° C. melting point, and the temperature is raised or lowered to produce lower or higher melting point resins, respectively. If desired, the polymerization process may be carried out by introducing the oil containing polymerizable material, catalyst and catalyst modifier of the invention gradually into a reaction vessel at a rate sufficient to maintain the concentration of the modifier, catalyst and polymerizable material substantially uniform so that polymerization proceeds at a practically constant rate. This procedure facilitates maintenance of the polymerization temperature at a constant desired value.

When the polymerization is complete the catalyst may be removed from the oil by filtration of the oil in the presence of adsorption agents such as infusorial earth, adsorptive clays or aluminum hydroxide. Alternatively the catalyst may be precipitated by treatment of the oil with basic reagents such as sodium carbonate, caustic alkali, lime, ammonia or amines, e. g. aliphatic amines boiling below 200° C. such as n-butyl amine or pyridine, and then separated from the oil by filtration, preferably in the presence of a filter aid. The resin may then be recovered from the oil by conventional methods such as distillation, preferably steam or vacuum distillation, or by precipitation with alcohol.

Where resins of particularly light color are desired the oil may be pretreated to remove color-forming bodies such as dicyclopentadiene prior to polymerization by stannic chloride catalyst. Such pretreatment may be carried out in various ways; for example, pretreatment of the resin oil with dilute, e. g. 50° Bé. sulfuric acid, or heating the oil to effect heat polymerization of a portion of the polymerizable content of the oil, results in obtainment of resins of lighter color than when un-pretreated oil is subjected to the action of stannic chloride catalyst and catalyst modifier of the invention.

The following examples are further illustrative of the invention:

Example 1

A drip oil fraction boiling within the range 150° to 205° C. and containing about 50% by weight of polymerizable material, chiefly styrene, methyl styrenes, indene and their homologues was mixed at about 30° C. with 0.2% by volume of anhydrous methanol based on the oil. To 1001 parts by volume of the resultant mixture, 5 parts by volume of anhydrous stannic chloride (.5% by volume based on the oil) were added. The ratio of methanol to stannic chloride by volume was 0.4:1. The temperature of the oil rose more than 40° C. within 15 minutes and polymerization of the resin-forming constituents of the oil was practically complete within 3 hours. Repetition of Example 1 with the same amounts of the same materials except that no methanol was used resulted in a rise in temperature of the oil of only about 16° C., indicating that the reaction took place at a slower rate than when the methanol was present, and at least 6 hours was required to effect polymerization of approximately the same percentage of the polymerizable content of the oil as was accomplished in the presence of the methanol within 3 hours.

Example 2

The same procedure and materials were utilized as in Example 1 except that about 0.2 per cent by volume, based on the oil, of 95% aqueous ethyl alcohol was employed as catalyst modifier instead of methanol. The ratio of ethyl alcohol to stannic chloride by volume was 0.4:1. The temperature of the oil rose about 27° within 15 minutes as compared with a temperature rise of about 16° when no alcohol was utilized. At least 6 hours was required to effect polymerization of approximately the same percentage of the polymerizable content of the oil in the absence of ethanol as was accomplished in its presence within 3 hours.

Example 3

The same procedure and materials were utilized as in Example 1 except that about 0.2 per cent by volume, based on the oil, of ethylene chlorhydrin was employed as catalyst modifier instead of methanol. The ratio of ethylene chlorhydrin to stannic chloride by volume was 0.4:1. The temperature of the oil rose more than 33° C. within less than 15 minutes as compared to a temperature rise of about 16° C. within 15 minutes when no ethylene chlorhydrin was utilized. At least 6 hours was required to effect polymerization of approximately the same percentage of the polymerizable content of the oil in the absence of ethylene chlorhydrin as was accomplished in its presence within 3 hours.

Use of the catalyst modifiers employed in Examples 1 to 3 inclusive also substantially accelerates the stannic chloride polymerization of the resin-forming content of coal tar distillate fractions boiling within the range 125° to 205° C. Other primary alcohols and aldehydes such as n-hexyl alcohol, furfuryl alcohol, formaldehyde, acetaldehyde, butyraldehyde and benzaldehyde accelerated to a marked extent the stannic chloride polymerization of the resin-forming content of coal tar distillate and drip oil.

Thus the invention provides an accelerated process for the stannic chloride polymerization of coumarone-indene-styrene type constituents present in coke oven tar distillates, water gas tar distillates, drip oils, and the like, and permits a substantial reduction of the amount of stannic chloride catalyst required to effect complete polymerization of the resin-forming constituents of such oils within a given time. The invention facilitates removal of the unsaturated resin-forming constituents from the oils, and augments the refining action of the stannic chloride catalyst on the oils. Furthermore, the process of the invention produces resins of somewhat higher melting point than are obtainable by using the same amount of stannic chloride alone.

The resin melting points given herein are determined by the cube-in-mercury method described in "Protective and Decorative Coatings" vol. I, copyright 1941, by J. J. Matiello, pages 366–367, published by John A. Wiley & Sons, Inc., New York, New York.

Since certain changes may be made without departing from the scope of the invention, it is intended that the above shall be interpreted as illustrative and not in a limiting sense.

We claim:

1. A process for the production of polymeric resinous products which comprises subjecting an oil containing as the predominating polymerizable constituents at least one polymerizable material selected from the group consisting of indene, coumarone, styrene and their alkyl substituted derivatives, to the polymerizing action of stannic chloride catalyst, the reaction mixture also containing an amount of catalyst modifier sufficient to accelerate materially the polymerization of the resin-forming constituents of the oil, said modifier being an organic compound selected from the group consisting of (a) saturated aliphatic primary monohydroxy alcohols, furfuryl and benzyl alcohols, and (b) saturated aliphatic aldehydes and aromatic aldehydes, said compound containing not more than 8 carbon atoms in the molecule.

2. A process as defined in claim 1 in which the organic compound employed is a saturated aliphatic primary monohydroxy alcohol containing not more than 4 carbon atoms.

3. A process as defined in claim 1 in which the organic compound employed is a saturated aliphatic aldehyde containing not more than 4 carbon atoms.

4. A process of producing polymeric resinous products which comprises introducing into an aromatic oil boiling within the range of 125° to 235° C. and containing as predominating polymerizable constituents at least one polymerizable material selected from the group consisting of indene, coumarone, styrene and their alkyl substituted derivatives, .1% to 5% of stannic chloride based on the volume of the oil and a polymerization accelerating amount not more than 1% by volume based on the oil, of an organic compound selected from the group consisting of (a) saturated aliphatic primary monohydroxy alcohols, furfuryl and benzyl alcohols and (b) saturated aliphatic aldehydes and aromatic aldehydes, said compound containing not more than 8 carbon atoms in the molecule, and obtaining as product a polymeric resin.

5. A process of producing polymeric resinous products from aromatic oil fractions boiling within the range of 125° to 235° C. and containing as predominating polymerizable constituents at least one member of the group consisting of indene, coumarone, styrene and their alkyl substituted derivatives, which comprises polymerizing the resin-forming content of the oil by introducing into said oil stannic chloride catalyst and an amount of catalyst modifier sufficient to accelerate materially the polymerization of the resin-forming constituents of the oil, said modifier being selected from the group consisting of (a) saturated aliphatic primary monohydroxy alcohols, furfuryl and benzyl alcohols and (b) saturated aliphatic aldehydes and aromatic aldehydes, the modifier containing not more than 8 carbon atoms in the molecule.

6. A process for producing paracoumarone resin from oil formed during the distillation of coal which comprises introducing into a fraction of such oil boiling within the range of 150° to 205° C., which fraction contains indene, substantially anhydrous stannic chloride catalyst and a catalyst modifier comprising an organic compound containing not more than 8 carbon atoms in the molecule, said compound being selected from the group consisting of (a) saturated aliphatic primary monohydroxy alcohols, furfuryl and benzyl alcohols and (b) saturated aliphatic aldehydes and aromatic aldehydes, the amount of stannic chloride being within the range of .25% to 1% based on the volume of the oil and the amount of said organic compound being within the range of 0.05 to 0.5 per cent by volume based on the oil and not exceeding 50 per cent by volume based on the stannic chloride.

7. A process as defined in claim 6 in which the catalyst modifier is methanol.

8. A process of producing paracoumarone resin from oil formed during the carburetion of water gas which comprises introducing into a fraction of such oil boiling within the range of 150° to 205° C., which fraction contains indene and methylstyrene, substantially anhydrous stannic chloride catalyst and a catalyst modifier comprising an organic compound containing not more than 8 carbon atoms in the molecule, said compound being selected from the group consisting of (a) saturated aliphatic primary monohydroxy alcohols, furfuryl and benzyl alcohols and (b) saturated aliphatic aldehydes and aromatic aldehydes, the amount of stannic chloride being within the range of .25% to 1% based on the volume of the oil and the amount of said organic compound being within the range of 0.05 to 0.5 per cent by volume based on the oil and not exceeding 50 per cent by volume based on the stannic chloride.

9. A process as defined in claim 8 in which the catalyst modifier is methanol.

10. A process of producing polymeric resinous products from an aromatic oil boiling within the range of 125°–235° C. and containing as the predominating polymerizable constituents at least one member of the group consisting of indene, coumarone, styrene and their alkyl substituted derivatives, which comprises incorporating into said oil, stannic chloride catalyst and a catalyst modifier consisting of an organic compound containing not more than 8 carbon atoms in the molecule, said compound being selected from the group consisting of (a) saturated aliphatic primary monohydroxy alcohols, furfuryl and benzyl alcohols and (b) saturated aliphatic aldehydes and aromatic aldehydes, the amount of stannic chloride being within the range of 0.1% to 5% based on the volume of the oil and the amount of said organic compound being not more than 1% by volume based on the oil and not exceeding 50% by volume based on the stannic chloride, and carrying out the polymerization reaction at a temperature within the range of minus 20° to 100° C.

11. A process as defined in claim 10 in which the catalyst modifier is methanol.

12. A process as defined in claim 10 in which the catalyst modifier is ethanol.

13. A process as defined in claim 10 in which the catalyst modifier is ethylene chlorhydrin.

THOMAS E. JORDAN.
EDWIN L. CLINE.

REFERENCES CITED

The following references are of record in the file of this patent:

UNITED STATES PATENTS

| Number | Name | Date |
|---|---|---|
| 1,720,929 | Staudinger | July 16, 1929 |
| 2,228,790 | Soday | Jan. 14, 1941 |
| 2,344,213 | Otto | Mar. 14, 1944 |
| 2,378,089 | Krotzer | June 12, 1945 |
| 2,384,916 | Holmes | Sept. 18, 1945 |
| 2,413,893 | Soday | Jan. 7, 1947 |
| 2,515,646 | Gould | July 18, 1950 |